June 5, 1934.　　　A. Y. DODGE　　　1,961,554
LUBRICATION DEVICE
Filed Jan. 12, 1933　　　2 Sheets-Sheet 1

INVENTOR.
ADIEL Y. DODGE
BY
ATTORNEY.

June 5, 1934.   A. Y. DODGE   1,961,554
LUBRICATION DEVICE
Filed Jan. 12, 1933   2 Sheets-Sheet 2

INVENTOR.
ADIEL Y. DODGE
BY
ATTORNEY.

Patented June 5, 1934

1,961,554

UNITED STATES PATENT OFFICE 1,961,554

LUBRICATION DEVICE

Adiel Y. Dodge, South Bend, Ind., assignor to The Lubrication Corporation, South Bend, Ind., a corporation of Delaware Application January 12, 1933, Serial No. 651,335

2 Claims. (Cl. 206—56)

This invention relates to improvements in lubricating devices and, more particularly, to lubricant cartridges for use with lubricating guns or other similar lubricant feeding devices.

An object of the invention is to provide a lubricant cartridge, for use in lubricant feeding apparatus, wherein both side walls and piston may be formed of cardboard or heavy paper and in which the head or that part of the cartridge subjected to stresses or strain through the interconnection of the cartridge to the gun or feeding apparatus may be of metal.

A further object is to provide a lubricant cartridge having a cardboard or paper piston wherein a rigid piston backing plate may be employed for uniformly subjecting the piston to spring pressure as when used in a gun or feeding device in which lubricant from the cartridge is to be delivered into the cylinder thereof under greater than atmospheric pressure. It is contemplated that the backing plate may be supplied as an accessory wherever the cartridge is to be used in a gun or feeding device as described.

Another object is to provide a lubricant cartridge as described having a joint of novel construction between the fragile side walls and the metallic head thereof which aside from providing a lubricant tight seal, precludes the separation of the joint under mechanical forces tending to draw the side walls away from the head.

A further object is to provide a lubricant cartridge which may be manufactured at a relatively low cost.

Other objects, the advantages and uses of the invention will be or should be apparent after a reading of the following description and claims and after considering the accompanying drawings, in which:

In general, the lubricant cartridges illustrated herein comprise, a metal head plate A having an outlet opening B therethrough, cylindrical side walls C of fibrous material joined to the head plate A by a seam D, a piston E slidably mounted within the side walls C and screw thread or bayonet lug means F for detachably securing the cartridge upon the cartridge connector plate G of a lubricant gun H or other lubricant feeding device.

Figure 1:
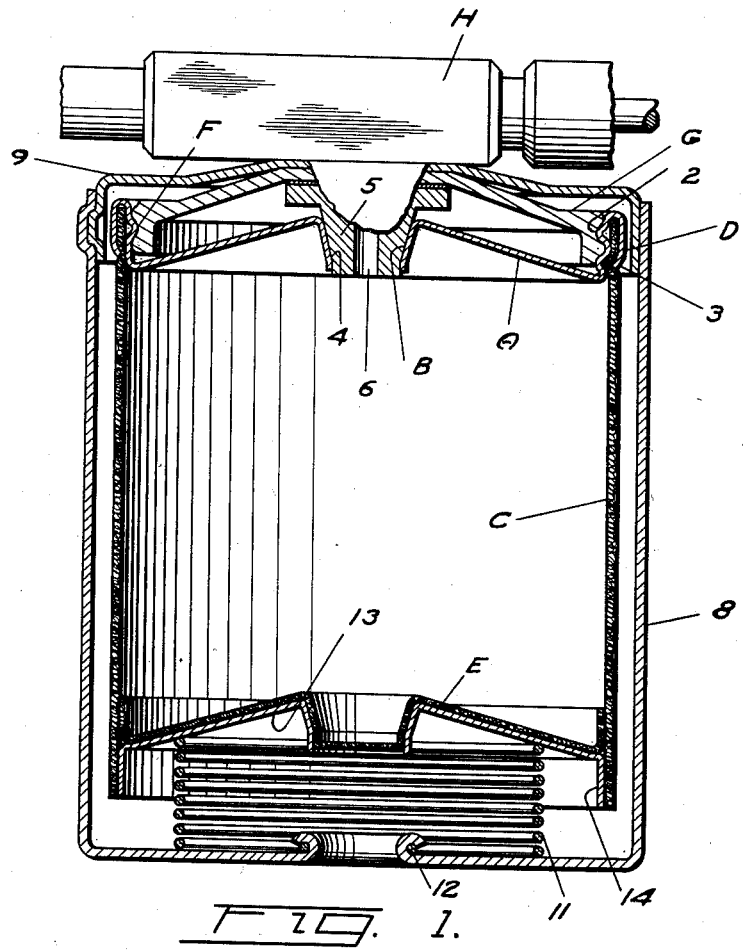
Fig. 1 is a sectional view of a cartridge constructed, in accordance with the invention, in place upon a lubricant gun.

The cartridge of Fig. 1 is constructed with the cartridge attachment means F in the form of rolled screw threads 2 located on the inner wall of the seam D for engagement with similar screw threads formed on the periphery of the cartridge connector plate G. The seam D is located at the outer edge of the head plate A and comprises a portion of the head plate drawn substantially U shaped in cross section, between the inner and opposed walls of which, the upper end of the fibrous side walls C is compressed. In order that the side walls may not be drawn away from the head plate and to assure a lubricant tight joint therebetween, the free edge 3 of the U shaped head plate section is spun inwardly into the soft material of the side walls. The side walls C are preferably constructed of thin cardboard, treated to prevent the lubricant contents of the cartridge from seeping through.

The outlet opening B may be located centrally of the head plate A and its side walls 4 inclined for engagement by wedging action with the inclined side walls of a cartridge connector stud 5 to form a lubricant tight seal between the cartridge and stud. The bore 6 of the stud 5 represents the inlet port of the lubricant gun H through which lubricant may pass into the gun cylinder.

The cartridge of Fig. 1 is supplied with a piston E formed of fibrous material of the kind used in forming the side walls C and a cover 7 of the same material for closing the lower end of the cartridge during shipment and handling prior to its use upon the gun H. The cover 7 serves not only to protect the lower edge of the cartridge side walls and to confine the piston E therein, but also functions to prevent the escape of any lubricant which might leak past the piston, particularly during shipment.

The gun H may be provided with a protective housing 8 for the cartridge, detachably mounted upon a head member 9 rigidly fixed to the gun between the stud 5 and the adjacent walls of the gun cylinder. A compression spring 11 may be fixed at 12 to the inner end wall of the housing 8 for applying thrust to the piston E, thereby placing the lubricant in the cartridge under slight pressure. In such instances as when the spring 11 is employed for urging the piston E forwardly within the cartridge, a metal back plate 13 may be employed between the spring 11 and the rearward face of the cardboard piston E. The plate 13 is formed to follow closely the contour of the piston E and has a rearwardly extending skirt 14 at its periphery engageable with the inner surface of the cartridge wall C to guide the piston assembly, thus provided, along the cartridge wall and to smooth out the cartridge wall as the piston is urged forwardly, thereby preventing the jamming of the paper or cardboard piston E within the cartridge side walls should the cartridge become slightly misformed through abuse or accident. Both piston E and backing plate 13 are fashioned to conform to the inner wall of the head plate A and stud 5, thereby assuring the complete removal of the lubricant contents of the cartridge under piston function.

It is contemplated that the backing plate 13 shall be supplied as a gun accessory in all cases wherein the spring 11 is to be used to urge the piston E against the lubricant contents although, if desired, it may be included as a part of the cartridge assembly.

Figure 2:
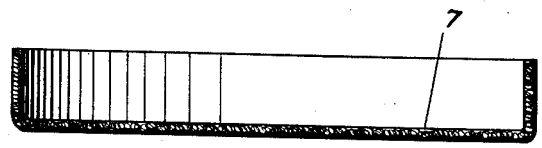
Fig. 2 is a sectional view of an end closure cap for the cartridge of Fig. 1.

The cartridge of Figs. 1 and 2 may, by virtue of the materials employed and simplicity of structure, be manufactured at a very low cost, thus giving the purchaser maximum value, in lubricant contents. The structure employed for perfecting both mechanical and lubricant connection between the cartridge and gun is such as to preclude any strain upon the fibrous materials of the side walls and piston regardless of interlocking mechanical pressure. Uniform pressure on the paper or cardboard piston through the medium of the spring 11 is made practical by use of the backing plate 13, as described.

Figure 3:
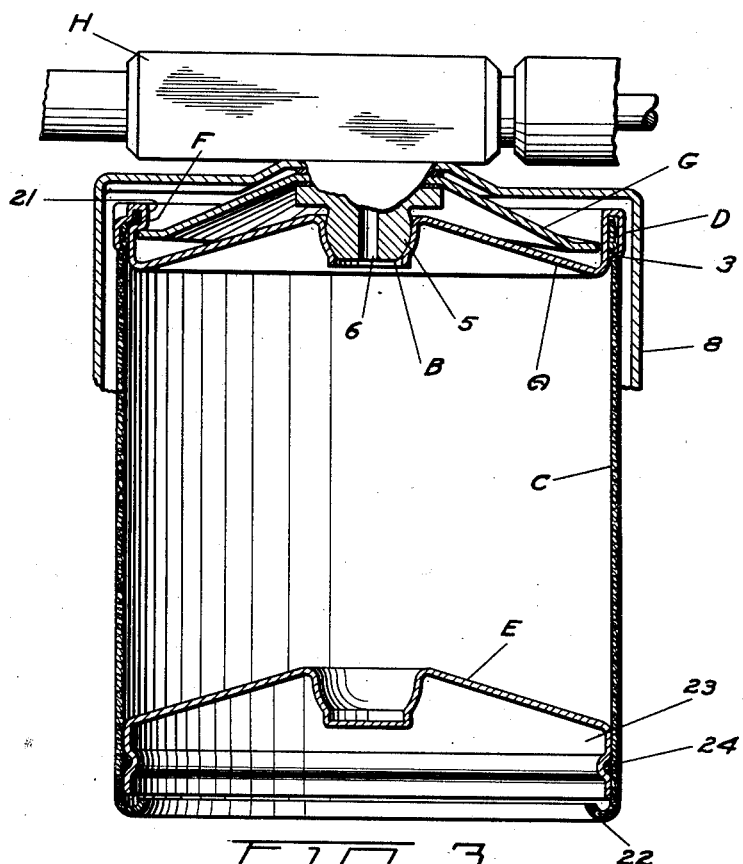
Fig. 3 is a view similar to Fig. 1 of another form of the cartridge.

In Fig. 3, another form of the cartridge is shown which differs from that form of Figs. 1 and 2 principally in the use of bayonet lugs 21 in place of the rolled threads 2 which are engageable with complementary bayonet members formed on the edge of the connector plate G and in the use of an all metal piston E in place of a paper or cardboard piston. The seam D is constructed substantially as shown in Fig. 1, having one edge 3 spun inwardly to grip the side walls tightly under compression.

If desired, the external surface of the stud 5 may be spherical and the walls of the cartridge outlet opening formed in like manner to provide a universal joint through the contacting areas, thus assuring a tight seal under relative thrust regardless of slight tilting of the cartridge head such as might result through irregularities in the attachment means F.

The lower edge 22 of the side walls C may be rolled inwardly to lend reinforcement thereto and to confine the piston E within the cartridge. The piston E may be of the conventional type having an integral rearwardly extending skirt 23 provided with a cord packing ring 24. As in the case of the cartridge first described the contour of the piston may be such as to closely follow the contour of the inner wall of the head plate A and stud 5 so that complete removal of the cartridge may be carried out.

Figure 4:
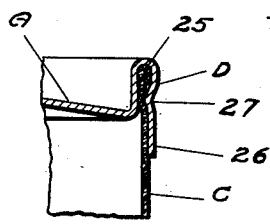
Figs. 4, 5 and 6 are fragmentary sectional views illustrating, respectively, three forms of the joint or seam employed to secure the fibrous cartridge side walls to the head thereof.

In Fig. 4 another form of the seam D is shown which contemplates the doubling back of the upper edge of the fibrous side walls C as shown at 25 to provide a double thickness of the wall for reception between the opposed surfaces of the U shaped head plate section. The outermost wall 26 of the U section extends rearwardly beyond the major portion of the head plate and along the outer surface of the side wall C and an annular indentation 27 is formed therein below the doubled portion of the side wall edge to compress and secure the side wall tightly in sealing relationship with the head plate A.

Figure 5:
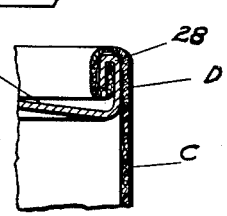

The joint D of Fig. 5 differs from those heretofore described in that a double fold 28 of both the head plate and side wall edges is formed toward the axis of the cartridge, thus leaving the fibrous material of the side wall C exposed at the joint.

Figure 6:
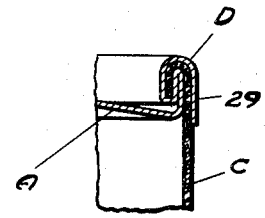

In Fig. 6, another type of joint D is shown wherein the upper edge of the side wall C is folded inwardly over the edge of the head plate A and wherein an adjacent portion 29 of the head plate is folded over the side wall as shown, thus protecting the fibrous material as well as securing the side wall in place tightly upon the head plate.

Figure 7:
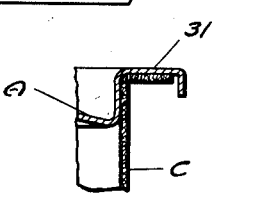
Fig. 7 is a fragmentary sectional view of another form of the cartridge joint or seam during the process of formation; and, Fig. 8 is a sectional view of the joint of Fig. 7 completed.
Figure 8:
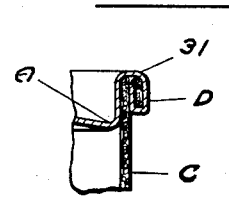

Figs. 7 and 8 illustrate a further form of the joint D which is substantially a reversal of the arrangement of the joint of Fig. 5 leaving the metal of the head plate exposed at the joint as shown at 31 and the double fold turned outwardly instead of toward the cartridge axis.

In all of the forms of the joint D illustrated herein, a mechanically strong as well as lubricant tight union of the parts is afforded.

It is to be understood that the embodiments of the invention herein set forth are presented for the purpose of illustration only, and various changes may be made therein without departing from the spirit and scope of the appended claims.

I claim:

1. A lubricant cartridge for use with a lubricant feeding device comprising, a circular metal head plate having an outlet opening therethrough, a cylindrical side wall of fibrous material, said side wall being joined to the periphery of said head plate by a seam wherein at least a portion of the side wall contacting the head is compressed, and bayonet lugs on said seam for detachably securing said cartridge to said feeding device.

2. A lubricant cartridge for use with a lubricant feeding device comprising, a metal head plate having an outlet opening therethrough, and side walls of fibrous material joined to said head plate, the joint between said side walls and head plate including parallel and folded portions of the adjacent edges of the side walls and head plate whereby relatively large contacting areas thereof are provided to produce a lubricant tight seal therebetween, said joint having portions embossed to provide bayonet lugs for securing the cartridge to said feeding device.

ADIEL Y. DODGE.